Figure 1:
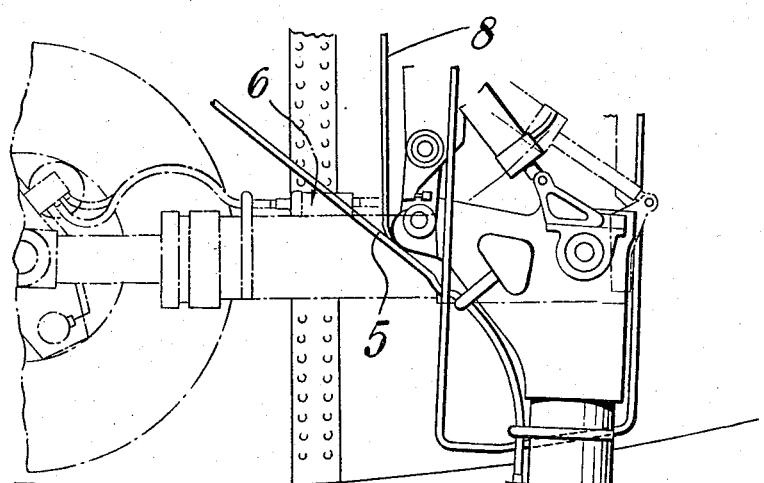
Figure 1:
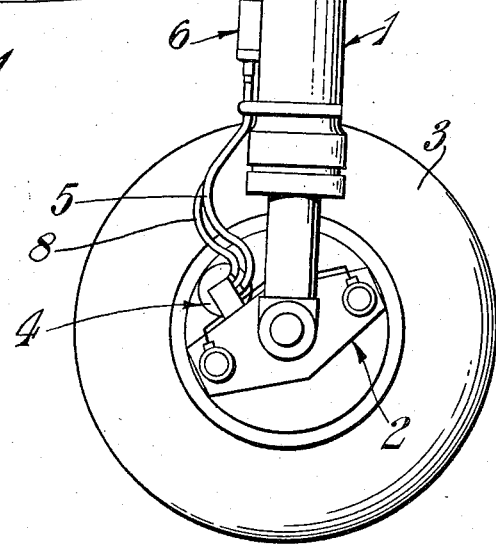

March 17, 1959  F. R. MORTIMER  2,877,800
FLUID PRESSURE DAMPERS

Filed Nov. 17, 1955  2 Sheets-Sheet 1

INVENTOR
Frank Radcliffe Mortimer
by Benj. T. Rauber
his attorney

United States Patent Office 2,877,800
Patented Mar. 17, 1959

2,877,800

FLUID PRESSURE DAMPERS

Frank Radcliffe Mortimer, Stivichale, Coventry, England, assignor to Dunlop Rubber Company Limited, London, England, a British company Application November 17, 1955, Serial No. 547,503

Claims priority, application Great Britain December 4, 1954

3 Claims. (Cl. 138—26)

This invention relates to fluid-pressure dampers and more particularly to fluid-pressure dampers for aircraft braking systems incorporating an automatic brake control apparatus for preventing skidding or sliding of the aircraft wheels.

It is well known to provide aircraft with retractable landing wheels, and fluid-pressure operated wheel braking systems whereby, upon landing, the wheel brakes are applied by the pilot of the aircraft; the degree of application of said brakes depending upon the pressure applied by the pilot to the brake pedal, pedals or other device whereby a brake control mechanism is operated.

It is also known to apply to such braking systems an automatic brake control apparatus whereby, and irrespective of any extreme pressure applied by the pilot, the brakes are prevented from locking the wheels of the aircraft; such apparatus normally being of the rotary inertia type whereby the brakes are momentarily released and re-applied should the normal rate of progress of the aircraft on the ground suddenly be checked or impeded as by a brake so fiercely applied as to tend to lock the wheel or wheels; such release taking place before skidding or locking actually occurs.

It has been found that such automatic brake control apparatus, when fitted to certain types of aircraft, is inclined to intensify judder or vibration of the oleo struts when the aircraft is landing and the brakes are applied. It is thought that this is due to the leg flexing when the brake is applied and flexure of the leg relative to the aircraft alternatively accelerates and decelerates the wheel. This in turn actuates the automatic brake control apparatus which responds by checking and releasing braking pressure in sympathy with the flexing of the leg. Thus the natural period of the leg is excited and in a very short time a heavy vibration or judder sets in over all the aircraft.

The object of the present invention is to provide a fluid-pressure damper for smoothing out pressure surges of this nature.

Another object of the invention is to provide a braking system wherein vibration and judder due to pressure surges is largely overcome.

According to the invention a fluid-pressure damper comprises a cylinder having at one end thereof an inlet adapted to communicate with a source of pressure fluid and at the other end an outlet adapted to communicate with a fluid-pressure operated device, a piston slidable in said cylinder and having a restricted passage for pressure fluid therethrough, spring means adapted to urge said piston towards the inlet end of the cylinder and means to introduce a progressive increase in the restriction of the fluid flow from the outlet end of the cylinder after initial movement of the piston from said inlet end.

According to the present invention also a fluid-pressure braking system for aircraft having wheel brakes associated with automatic brake control apparatus of the rotary inertia type applied to each wheel and a fluid-pressure control mechanism under the control of the pilot of the aircraft for applying the wheel brakes, has interposed in the fluid-pressure line between said control mechanism and said automatic brake control apparatus a fluid-pressure damper comprising a cylinder having at one end thereof an inlet communicating with said fluid-pressure control mechanism, and at the other end an outlet communicating with said automatic brake control apparatus, a piston slidable in said cylinder and having a restricted passage for pressure-fluid therethrough, spring means adapted to urge said piston towards the inlet end of the cylinder, and means to introduce a progressive increase in the restriction of the fluid flow from the outlet end of the cylinder after initial movement of the piston from said inlet end.

Preferably the means to permit a restricted flow of pressure-fluid from the outlet of the cylinder comprises a plunger extending axially from the piston towards the outlet end of the cylinder, the part of said plunger adjacent the piston being provided with a helical groove. The end of the plunger is of cruciform cross-section and the whole plunger is slidable within a tubular member extending axially inwards from the outlet end of the cylinder.

The damper is particularly designed for, and is of particular value in, braking systems incorporating an automatic braking apparatus, e. g. of the type more fully described in our British patent specification No. 676,708.

Figure 2:
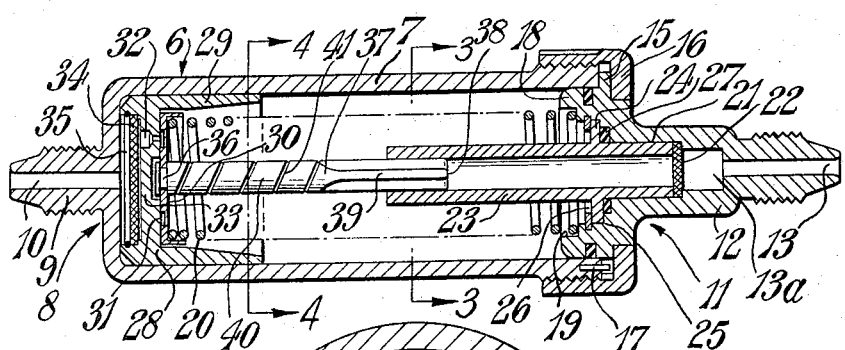
Figure 3:
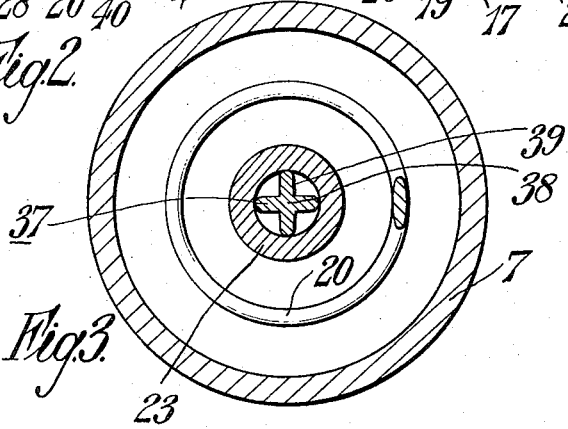
Figure 4:
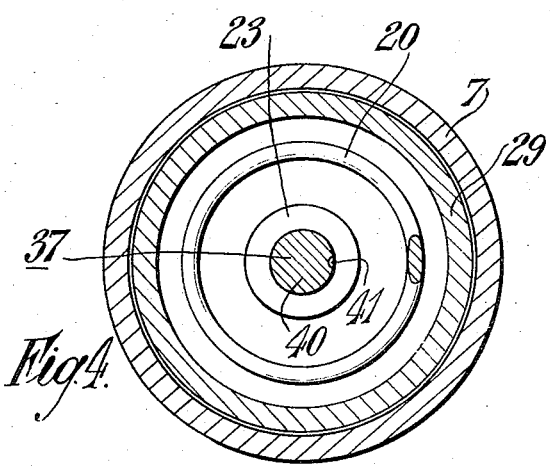

A preferred embodiment of our invention as applied to an aircraft will now be described with reference to the accompanying drawings, of which:

Figure 1 is a side view showing the fluid-pressure damper installed in relation to the brakes and automatic brake control apparatus of a retractable undercarriage leg for an aircraft, Figure 2 is a longitudinal section through a fluid-pressure damper according to the invention, Figure 3 is a section along the line 3—3 of Figure 2, looking in the direction of the arrows, and Figure 4 is a section along the line 4—4 of Figure 2 also looking in the direction of the arrows.

In one embodiment of the present invention a braking system for an aircraft having retractable undercarriage legs 1 (Figure 1) comprises wheel brakes 2 associated with the wheels 3 of each undercarriage leg 1, an automatic brake control apparatus 4 of the rotary inertia type, as described in our British patent specification No. 676,708, associated with each wheel and a control valve mechanism of known type under the control of the pilot of the aircraft for applying the wheel brakes.

Although such arrangements are already well known in the art, the operation thereof, in brief, is that as the wheel 3 of the aircraft touch down on landing the pilot applies his wheel brakes 2 by operating a pedal or the like (not shown), whereupon hydraulic fluid-pressure is applied in known manner through the control valve mechanism to the wheel brakes 2 through the pressure line 5 and the automatic brake control apparatus 4.

The automatic brake control apparatus 4 comprises a rotary inertia-type mechanism whereby the brakes of an aircraft or other vehicle are prevented from locking or binding through over-application of the brakes, and is fully described in British patent specification No. 676,708.

Inserted in the pressure line between the control valve mechanism and the automatic brake control apparatus 4 is a hydraulic fluid-pressure damper 6 comprising a cylinder housing 7 (Figure 2) having at one end an integral end wall 8 comprising a boss 9 through which is formed a hydraulic fluid inlet passage 10, the said inlet passage being adapted to be connected with the fluid-pressure line 5. The other end of the cylinder housing 7 is provided with a cap 11 comprising a boss 12 through which is formed an outlet passage 13 which is adapted to be connected by suitable means with the hydraulic fluid-pressure line 5 whereby said outlet passage 13 is in communication with the automatic brake control apparatus 4. The inner face of said cap 11 is formed with an annular flange 15 adapted to abut the open end of cylinder 7, and is secured to said cylinder as by an annular axially flanged ring 16 which is adapted to be secured to said cylinder by known means. A locking pin or screw 17 may be provided if desired.

Inwardly of the flange 15 is formed an annular boss 18 the outer periphery of which is adapted slidingly to engage the inner surface of the adjacent end of the cylinder 7. The inner peripheral edge of said boss 18 is formed with a recess 19 adapted to receive one end of a helical spring 20 which is further described hereunder.

The end cap 11 is formed with an inner counterbore to form a passage 13a axially aligned with the outlet 13, and this bore has an axial enlargement 21 to receive a filter disc 22. Inserted in said enlarged bore 21 is a tubular member 23 which is formed with a flange 24, said flange being located within an annular recess 25 in said end cap 11 and being held in position therein by a circlip 26. A sealing member 27 is located between said flange 24 and said end cap 11.

Located within said cylinder 7, and normally urged towards said end cap 18 by helical spring 20 is a skirted piston 28, the skirt 29 thereof being directed towards the end cap 11. The spring 20 is retained inside the skirt by means of an annular spring locator 30 having on the face thereof adjacent the piston 28 an annular groove 31 which communicates with a restrictor hole 32 formed through the head 33 of the piston. The spring locator 30 is held in place by the spring 20. The head 33 of the piston is suitably recessed to take a filter disc 34 which is held in place as by a circlip 35.

Associated with said piston 28, and preferably held in position thereon as by a groove 36 adapted to be engaged by the inner periphery of the annular spring locator 30 is an axially inwardly-directed plunger 37, the inner end 38 of which is fitted slidably in the tubular member 23. This latter end of said plunger 37 and substantially half of its length back towards the piston 28, is of cruciform section as at 39 and the remainder of said plunger is cylindrical as at 40; being formed upon the surface of said cylindrical portion 40 with a helical groove 41 of substantially semi-circular section.

Operation of the device and of the system wherein it is incorporated is as follows (the description being limited to one landing wheel only):

As the aircraft lands and the landing wheel 3 rotates, the pilot depresses the brake pedal whereupon pressurised hydraulic fluid is fed from the control mechanism through the fluid line 5 and fluid pressure damper 6 (the operation of which is described hereunder) to the automatic brake control 4 which operates in the manner described in the aforementioned patent specification and permits the brake to be applied to the landing wheel to an extent governed by the force used by the pilot on applying the brake and yet, by means of the automatic brake control 4, prevents the wheel from sliding and skidding on the landing surface. The hydraulic fluid on subsequent release of the brake pedal returns to a reservoir from the automatic brake control through the hydraulic fluid line 8 in known manner.

The hydraulic fluid-pressure damper 6 is inserted in the fluid pressure line 5 between the control valve mechanism and the inlet valve of the automatic brake control 4. The precise location of this damper 6 is not arbitrary, although it is preferred to have it located as close as practicable to the automatic brake control in order to eliminate time lag in the control to be exercised by the damper upon the automatic brake control mechanism 4. Accordingly the damper may be located on the fixed portion of the oleo leg immediately adjacent the wheel 3.

As the hydraulic fluid-pressure is delivered to the inlet 10 of the fluid-pressure damper 6 from the line 5, as previously referred to, it flows through the inlet 10 into the space defined by the recessed portion of the piston head and the inner face of the end wall 8 of the cylinder 7.

(It should be emphasised that, in accordance with known hydraulic fluid-pressure procedure, the whole of the fluid passages and spaces in the pressure system and components are to be regarded as being completely filled with hydraulic fluid, so that where "flow" is referred to in this description such term does not necessarily mean more than a relative and minor movement occasioned by compression of the already-present fluid to produce an increase in pressure.)

As the pressurised hydraulic fluid flows into the said space it acts upon the head of the piston 28 and forces it against its spring 20 towards the outlet end 11 of the cylinder 7. This initial movement of the piston takes up the clearance normally present in a brake and conditions it for instant complete application.

The plunger 37 moves with the piston and normally, by the time the brake clearances have been taken up and the brake is actually applied, the cruciform portion 39 of the plunger is almost entirely located within the tubular member 23. The flow of fluid, under pressure of the piston 28, through the tubular member 23, passage 13a, outlet duct 13 and line 5 to the automatic brake control 4 and brake 2 is substantially unrestricted by the cruciform portion 39 of the plunger 37.

If, now, the brakes have been applied so hard, or if landing conditions are such, that wheel lock and skidding is about to occur, the automatic brake control apparatus 4 functions, as described in British patent specification No. 676,708, momentarily to release the brake pressure at a point before actual wheel lock or skidding takes place, and to allow the wheels to rotate normally once more. As soon as the skidding or locking tendency is averted the automatic brake control 4 automatically re-applies the braking pressure again. This sequential application and release of the brakes may continue a number of times before the aircraft is brought to rest, and as a result of this periodic application and release, pressure surges are likely to occur between the control valve mechanism and the automatic brake control 4, causing the judder or vibration of the oleo struts previously referred to.

The interpositioning of the fluid pressure damper 6 in the line 5 smooths down these pressure surges in the following manner:

On each braking pressure release by the automatic brake control 4 a certain volume of pressure fluid is allowed to flow to exhaust by the opening of the exhaust valve therein. This causes a pressure drop in the brake, but as the inlet valve of the automatic brake control 4 is closed at this time this pressure drop does not affect the hydraulic fluid pressure in the damper 6 nor in the fluid line 5.

As soon as the incipient wheel lock, slide or skid is checked, the inlet valve of the automatic brake control 4 opens and hydraulic pressure-fluid from the damper 6 moves in to re-apply the brakes. This causes a temporary release of pressure on the output side of the damper piston 28 so that the greater pressure on the inlet side of the said piston moves it against the spring 20 towards the output end of the damper. Hydraulic pressure fluid flows through the restrictor passage 32 and annular space 31 from the inlet 10 to the output side of the piston 28, and as the pressure differential decreases the spring 20 gradually moves the piston back to a balanced substantially mid-way position, in which the portion 40 of the plunger 37 and its associated helical groove 41 are partly entered into the tubular member 23 substantially restricting the flow of hydraulic pressure-fluid therethrough in either direction.

On subsequent release and re-application of the brake by the automatic control mechanism 4 (i. e. "hunting") the flow of hydraulic pressure-fluid from the cylinder 6 to the inlet valve of said mechanism has to pass through the helical groove 41 between the plunger 37 and the wall of the tubular member 23, and its flow is accordingly restricted. The degree of restriction increases with the depth to which the plunger 37 is engaged in the tubular member 23 and so with the extent of helical groove 41 through which the pressure fluid has to pass.

On the first re-application of the brakes after the initial release there is a balancing pressure surge from the damper 6 to the automatic brake control apparatus 4. This gradually diminishes with each successive check and re-application and after four or five such successive cycles the damper 6 has substantially smoothed-out pressure surges between the source of pressure and the brakes and dangerous judder and vibration has been obviated.

It will be obvious that the more prone to skidding and locking the wheel is on any particular occasion the more positive will be the damper 6 in preventing dangerous pressure surges and vibration as, if the succeeding releases and re-applications of the brakes are in such quick succession that the restrictor 32 has insufficient time to equalise the pressure differential on opposite sides of the piston 28 and return the said piston to mid-way position, the further will the cylindrical portion 40 be passed into the tubular member 23, whereby a progressively greater restrictive effect will be exerted by the helical groove 41 until normal braking conditions obtain.

It is to be appreciated that a device as described above is intended to be associated with each of the wheels of an aircraft to which wheel brakes are applied.

It is also to be understood that when the automatic brake control apparatus 4 has settled down and is no longer releasing the brakes, pressure equilibrium is established on each side of the piston 28 which returns to its inoperative position, and the restricted passage 32 becomes ineffective; the hydraulic fluid pressure damper then having no effect upon the normal operation of the hydraulic fluid-pressure braking system per se.

Although the invention has been particularly described in relation to hydraulic fluid-pressure operation, it is to be understood that it is equally adaptable to be used in pneumatic pressure systems.

Having now described my invention—what I claim is:

1. A fluid pressure damper to dampen vibrational pulsation of a pressure fluid comprising a cylinder having at one end thereof an inlet to communicate with a source of pressure fluid and at the other end an outlet to communicate with a fluid pressure operated device, a piston slidable in said cylinder, said damper having a restricted passage for pressure fluid from one side of said piston to the other, spring means in said cylinder positioned to bias said piston toward the inlet end of the cylinder, and means operable by the movement of said piston against the action of said spring to introduce a progressive increase in the restriction of the fluid flow from the outlet end of the cylinder after initial movement of the piston from said inlet end, said means comprising a tubular element extending from said outlet coaxially into said cylinder and a grooved stem extending from said piston into said tubular element to form a restricted passage of variable length therein.

2. The fluid pressure damper of claim 1 in which the groove of said stem is helical and in which said stem has a guide portion extending into said tubular element in advance of said helical groove.

3. The fluid pressure damper of claim 1 in which said restricted passage is in said piston.

References Cited in the file of this patent

UNITED STATES PATENTS

| | | |
|---|---|---|
| 780,986 | Francis | Jan. 31, 1905 |
| 1,879,197 | Greenwald | Sept. 27, 1932 |
| 1,891,632 | Battle | Dec. 20, 1932 |
| 1,958,398 | Smith | May 8, 1934 |
| 2,128,265 | Pechy | Aug. 30, 1938 |
| 2,426,238 | Platon | Aug. 26, 1947 |
| 2,656,017 | Trevaskis | Oct. 20, 1953 |
| 2,729,234 | Stevenson | Jan. 3, 1956 |